United States Patent
Prakash et al.

(10) Patent No.: US 9,451,343 B2
(45) Date of Patent: Sep. 20, 2016

(54) CONTROL PLANE EXTENSIONS FOR OPTICAL BROADCAST NETWORKS

(71) Applicant: Ciena Corporation, Hanover, MD (US)

(72) Inventors: Anurag Prakash, Nolda (IN); Mohit Chhillar, Pitam Pura (IN); Dominic Richens, Perth (CA); Hari Srinivasan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 26 days.

(21) Appl. No.: 14/656,797

(22) Filed: Mar. 13, 2015

(65) Prior Publication Data
US 2016/0227303 A1    Aug. 4, 2016

(30) Foreign Application Priority Data
Jan. 30, 2015    (IN) .............................. 275/DEL/2015

(51) Int. Cl.
*H04J 14/00* (2006.01)
*H04Q 11/00* (2006.01)
*H04B 10/00* (2013.01)

(52) U.S. Cl.
CPC ... *H04Q 11/0067* (2013.01); *H04Q 2011/0045* (2013.01); *H04Q 2011/0086* (2013.01)

(58) Field of Classification Search
CPC ............... H04J 14/0228; H04J 14/023; H04J 14/0213; H04J 14/0232; H04J 14/0234; H04J 14/0235; H04J 14/0236
See application file for complete search history.

(56) References Cited

U.S. PATENT DOCUMENTS

| | | | |
|---|---|---|---|
| 5,285,449 A | 2/1994 | Georgiou | |
| 6,480,309 B1 | 11/2002 | Lee et al. | |
| 6,895,184 B2 | 5/2005 | Way | |
| 8,131,149 B2 | 3/2012 | Zottmann | |
| 8,554,074 B2 | 10/2013 | Boertjes et al. | |
| 2003/0025961 A1 | 2/2003 | Way | |
| 2003/0147645 A1* | 8/2003 | Imajuku ............. | H04Q 11/0005 398/7 |
| 2005/0158047 A1 | 7/2005 | Way et al. | |
| 2006/0153496 A1 | 7/2006 | Tanobe et al. | |

(Continued)

FOREIGN PATENT DOCUMENTS

WO    2013127472 A1    9/2013

OTHER PUBLICATIONS

"Generalized Multi-Protocol Label Switching (GMPLS) Architecture," Network Working Group, E. Mannie, Ed., Oct. 2004, pp. 1-69.

(Continued)

*Primary Examiner* — Daniel Dobson
(74) *Attorney, Agent, or Firm* — Clements Bernard PLLC; Christopher L. Bernard; Lawrence A. Baratta, Jr.

(57) ABSTRACT

A method for bandwidth management in an optical broadcast network includes signaling, for a new optical broadcast service, from an originating node to all nodes in the optical broadcast network, wherein the signaling identifies a wavelength or portion of spectrum associated with the new optical broadcast service; at each of the nodes, checking for contention by the new optical broadcast service; responsive to identifying contention at one of the nodes, signaling the identified contention back to the originating node; and responsive to no contention at any of the nodes, processing the signaling, storing an update of the new optical broadcast service, and either forwarding the signaling to peer nodes or terminating the signaling.

20 Claims, 8 Drawing Sheets

(56) References Cited

U.S. PATENT DOCUMENTS

| | | |
|---|---|---|
| 2006/0275034 A9 | 12/2006 | Way et al. |
| 2010/0021164 A1* | 1/2010 | Luk .................... H04J 14/0226 398/72 |
| 2010/0111520 A1 | 5/2010 | Way |
| 2011/0222862 A1 | 9/2011 | Boertjes et al. |
| 2011/0268442 A1 | 11/2011 | Boertjes et al. |

OTHER PUBLICATIONS

"Architecture for the automatically switched optical network," Telecommunication Standardization Sector of ITU, Feb. 2012, pp. 1-124.

Jason P. Jue: "Lightpath Establishment in Wavelength-Routed WDM Optical Networks" In: "Optical Networks", Jan. 1, 2001 (Jan. 1, 2001), Springer US, Boston, MA, XP055277028, ISSN: 1568-1696 ISBN: 978-14613-0291-9 val. 6, pp. 99-122, DOI: 10.1007/978-1-4613-0291-9_5.

Hui Zang et al: "Dynamic Lightpath Establishment in Wavelength Routed WDM Networks", IEEE Communications Magazine, IEEE Service Center, Piscataway, US, vol. 39, No. 9, Sep. 1, 2001 (Sep. 1, 2001), pp. 100-108, XP011 091799, ISSN: 0163-6804.

Nagai S et al: "A Forward-Backward Optical Wavelength Path Establishment Scheme with Low Blocking Probability In WDM Networks", Proceedings of the 2007 IEEE International Conference on Communications (ICC 2007), Jun. 24-28, 2007, Glasgow, UK, IEEE, Piscataway, NJ, USA, Jun. 1, 2007 (Jun. 1, 2007), pp. 155-460, XP031125714, ISBN: 978-1-4244-0353-0.

* cited by examiner

CONTROL PLANE EXTENSIONS FOR OPTICAL BROADCAST NETWORKS

CROSS-REFERENCE TO RELATED APPLICATION(S)

The present patent application/patent claims the benefit of priority of Indian Patent Application No. 275/DEL/2015, filed on Jan. 30, 2015, and entitled "CONTROL PLANE EXTENSIONS FOR OPTICAL BROADCAST NETWORKS," the contents of which are incorporated in full by reference herein.

FIELD OF THE DISCLOSURE

The present disclosure relates generally to optical networking systems and methods. More particularly, the present disclosure relates to control plane extensions for optical broadcast networks.

BACKGROUND OF THE DISCLOSURE

Optical broadcast networks (also known as all-broadcast optical networks) operate based on a wavelength being available on all links of the network, without cycles. The wavelength is broadcast through an Optical Broadcast Unit (OBU) which can be a 2×2, 3×3, N×N splitter/combiner. The wavelength is accessed as desired at different nodes in the network, but it is available at all nodes. One advantage of such networks is the switching fabric is low complexity/cost in terms of hardware, i.e. splitters and combiners only, and protection switching is quick, i.e. addition/removal of a wavelength blocking device. It is expected that such networks will proliferate in campus, metro, and/or regional optical networks with coherent modulation/demodulation technologies, such as with tunable receivers which can tune to any frequency of interest selectively. Examples of broadcast optical networks are described in commonly assigned U.S. Pat. No. 8,131,149 issued Mar. 6, 2012 and entitled "OPTICAL ROUTING DEVICE AND OPTICAL NETWORK USING SAME" and commonly assigned U.S. Pat. No. 8,554,074 issued Oct. 8, 2013 and entitled "COLORLESS, DIRECTIONLESS, AND GRIDLESS OPTICAL NETWORK, NODE, AND METHOD," the contents of each are incorporated by reference herein. The optical broadcast networks can linear/star (hub and spoke)/tree topologies, with a constraint that cycles are not allowed in the topology, unless they contain the necessary switching or filtering functions to prevent wavelength interference. That is, one aspect of these networks is to selectively include a wavelength blocking element in the path to prevent such interference. Of note, the fundamental topology and operation of these networks is distinct from conventional architectures where a wavelength is directed between ingress and egress.

Networks at various layers are being deployed with control planes, Software Defined Networking (SDN), Network Functions Virtualization (NFV), and the like. Control planes provide automatic allocation of network resources in an end-to-end manner. Exemplary control planes may include Automatically Switched Optical Network (ASON) as defined in ITU-T G.8080/Y.1304, Architecture for the automatically switched optical network (ASON) (February 2012), the contents of which are herein incorporated by reference; Generalized Multi-Protocol Label Switching (GMPLS) Architecture as defined in IETF Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween. Control planes are configured to establish end-to-end signaled connections to route the connections and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

Of note, optical broadcast networks exhibit different operational behavior and switching behavior from conventional optical networks, utilizing control planes. The aforementioned control planes and SDN do not contemplate operation with the optical broadcast networks. In optical broadcast networks, the bandwidth management function is not only on the link in the optical service route, butt applies to all links in the network. This needs to be achieved in a distributed control plane environment. If a broadcast network integrates with a non-broadcast network (e.g., Reconfigurable Optical Add/Drop Multiplexer (ROADM), mesh, etc.) via switching points, bandwidth must be updated accordingly without breaking or modifying the network map view (topology). The optical broadcast network topology needs to be validated since it cannot support cycles without switching points. A horizontal synchronization (sync), as part of the control plane for node recovery (reboots) or link recovery (down to up) needs to allow for wavelength contention detection across a segmented broadcast network. Optimizations, in optical broadcast networks, also must permit retuning of wavelengths when contention is detected, such as in horizontal sync.

BRIEF SUMMARY OF THE DISCLOSURE

In an exemplary embodiment, a method for bandwidth management in an optical broadcast network includes signaling, for a new optical broadcast service, from an originating node to all nodes in the optical broadcast network, wherein the signaling identifies a wavelength or portion of spectrum associated with the new optical broadcast service; at each of the nodes, checking for contention by the new optical broadcast service; responsive to identifying contention at one of the nodes, signaling the identified contention back to the originating node; and responsive to no contention at any of the nodes, processing the signaling, storing an update of the new optical broadcast service, and either forwarding the signaling to peer nodes or terminating the signaling. The signaling can be provided to at least one node not in a path between the originating node and a terminating node of the optical broadcast service. The signaling can be performed through a control plane associated with the optical broadcast network.

Optionally, the signaling can be broadcast from the originating node to all peer nodes, on all links from the originating node. The signaling can be a setup message with instructions to all nodes in the optical broadcast network where provisioning is required to establish the new optical broadcast service and a same setup message without the instructions to all nodes in the optical broadcast network where provisioning is not required, but contention checking and database updates are required. The signaling the identified contention can be a crank-back to the originating node.

Alternatively, the signaling can be broadcast from the originating node to a terminating node along a path, and broadcast from the originating node and the terminating node to non-participating nodes through reservation messages, with a domino effect. The signaling the identified contention can be a forced deletion to the originating node. The update of the new optical broadcast service can be stored in a wavelength map maintained at each of the nodes in the network, and responsive to a link recovery between two nodes, each of the two nodes are configured to perform a horizontal synchronization with one another ensuring no contention exists by exchanging and validating associated wavelength maps. The signaling can be performed through a control plane configured to operate in a non-broadcast optical network, and wherein the signaling is provided to at least one node not in a path between the originating node and a terminating node of the optical broadcast service.

In another exemplary embodiment, a node in an optical network supporting an optical broadcast service includes a plurality of broadcast ports formed through an optical broadcast unit; and a controller configured to signal, for a new optical broadcast service, to all nodes in the optical network, wherein the signal identifies a wavelength or portion of spectrum associated with the new optical broadcast service, receive notification from all of the nodes related to contention in the optical network, responsive to contention in the optical network, retune the new optical broadcast service, and, responsive to no contention in the optical network, provision the new optical broadcast service. The controller can be configured to maintain a wavelength map that is updated responsive to signaling from other nodes in the optical network relative to newly provisioned optical broadcast services. The controller can be configured to, responsive to a link recovery between two nodes, perform a horizontal synchronization with another node ensuring no contention exists by exchanging and validating associated wavelength maps. The controller can be configured to operate a control plane, wherein the node can be an originating node of the new optical broadcast service, and wherein at least one node not in a path between the originating node and a terminating node of the new optical broadcast service is provided the signal, through the control plane. Optionally, the signal can be broadcast from the node to all peer nodes, on all links from the node. Alternatively, the signal can be broadcast from the node to a terminating node along a path, and broadcast from the node and the terminating node to non-participating nodes through reservation messages, with a domino effect.

In a further exemplary embodiment, an optical network with bandwidth management for optical broadcast services includes a plurality of nodes interconnected by a plurality of links; and a control plane configured to signal, for a new optical broadcast service, from an originating node to all nodes in the optical network, wherein the signal identifies a wavelength or portion of spectrum associated with the new optical broadcast service, at each of the plurality of nodes, check for contention by the new optical broadcast service, responsive to identified contention at a node, signal the identified contention back to the originating node, and, responsive to no contention at the node, process the signal, store an update of the new optical broadcast service, and either forward the signal to peer nodes or terminate the signal. At least one node not in a path between the originating node and a terminating node of the optical broadcast service can be provided the signal. The signal can be broadcast one of i) from the originating node to all peer nodes, on all links from the originating node or ii) from the originating node to a terminating node along a path, and broadcast from the originating node and the terminating node to non-participating nodes through reservation messages, with a domino effect. The update of the new optical broadcast service can be stored in a wavelength map maintained at each of the plurality of nodes, and responsive to a link recovery between two nodes, each of the two nodes can be configured to perform a horizontal synchronization with one another ensuring no contention exists by exchanging and validating associated wavelength maps.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods related to control plane extensions for optical broadcast networks are described. The systems and methods incorporate knowledge of nodal photonic technology in order to allow a control plane to track wavelength presence on links where a service is not actually provisioned, as is the case in optical broadcast networks. For example, when service provisioning on a link changes, in an optical broadcast network, the service's wavelength state is similarly changed on all other links that are part of the broadcast structure. The control plane can store this local state and forward this change to its peers, using control plane signaling. All peers store this change and similarly change the wavelength state on all other links that are part of the broadcast structure. As a result, the control plane's representation of that wavelength's state correctly reflects the physical presence of the wavelength on all links in the network. This enables correct wavelength selection for new services anywhere in the network. The control plane can also validate a network topology (e.g., detect cycles) based on a Minimum Spanning Tree and the number of links discovered in the network. The systems and methods also can detect contention between two parts of a network after they have been reconnected after a fault. Horizontal sync is used between the rejoined peers to detect contention. The systems and methods can select a new wavelength for one of the two conflicting services and signal the change of wavelength, thus restoring the two services after the two parts of the network are reconnected.

Advantageously, the systems and methods enable adaptation of existing control planes to support optical broadcast networks, individually or in a combination with other types of topologies (e.g., mesh, broadcast and select, etc.). The systems and methods contemplate operation with distributed control planes (e.g., ASON, GMPLS, etc.) as well as centralized control techniques (e.g., SDN, PCE, etc.). The systems and methods not only include extensions for managing broadcast networks, but can also support topology validation of the broadcast networks (e.g., identification of terminal and non-terminal nodes, topology, etc.). Also, the systems and methods can utilize wavelength retune for permanent optical services in the control plane provide self-healing contention resolution in optical broadcast networks.

Figure 1:
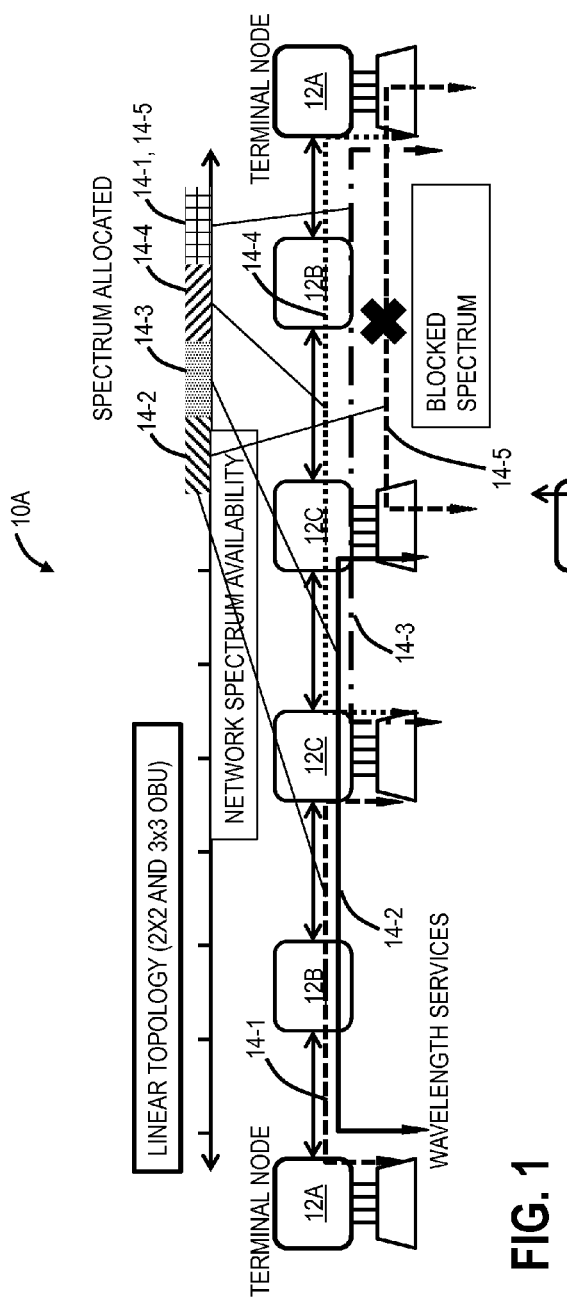
FIG. 1 is a network diagram of an optical broadcast network in a linear topology.
Figure 2:
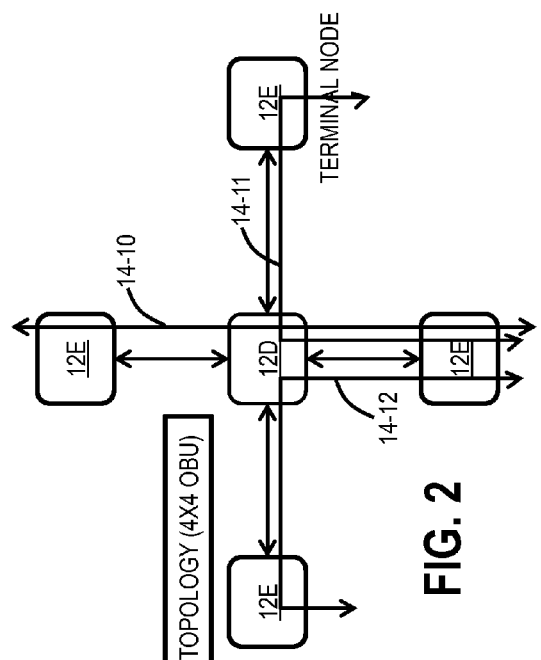
FIG. 2 is a network diagram of an optical broadcast network in a star topology.

Referring to FIGS. 1 and 2, in an exemplary embodiment, network diagram illustrate optical broadcast networks 10A, 10B in a linear topology (FIG. 1) and a star topology (FIG. 2). The optical broadcast networks 10A, 10B are presented as for illustration purposes and those of ordinary skill in the art will recognize optical broadcast networks can include other topologies such as mesh, rings, etc. The optical broadcast network 10 includes terminal nodes 12A, bypass nodes 12B, and intermediate add/drop nodes 12C. The terminal nodes 12A and the bypass nodes 12B can be formed with 2×2 OBU switches, and the intermediate add/drop nodes 12C can be formed with 3×3 OBU switches. The optical broadcast network 10 has an optical spectrum with wavelengths 14-1, 14-2, 14-3, 14-4, 14-5 allocated, i.e., provisioned. Since this is a broadcast structure, the allocated wavelengths are available everywhere even if a particular service is not between two nodes. For example, the wavelength 14-1 is between the first terminal node 12A and the first intermediate add/drop node 12C. The wavelength 14-5 is the same physical wavelength as the wavelength 14-1, and is provisioned between the last terminal node 12A and the second intermediate add/drop node 12C. Thus, the wavelengths 14-1, 14-5 logically do not overlap, but since this is a broadcast network—these wavelengths interfere with one another. Stated differently, the wavelength 14-5 should not be provisioned as the same wavelength as the wavelength 14-1.

The optical broadcast network 10B includes a hub node 12D which can be formed with a 4×4 OBU and four terminal nodes 12E which can be formed with 2×2 OBUs. Here, in a star topology, any of the terminal nodes 12E can be connected to any other of the terminal nodes 12E through the hub node 12D. For example, wavelengths 14-10, 14-11, 14-12 are illustrated. Again, because of the broadcast topology, the wavelengths 14-10, 14-11, 14-12 are available at all of the nodes 12E, whether or not a service associated with a wavelength is between two nodes 12E.

Figure 3:
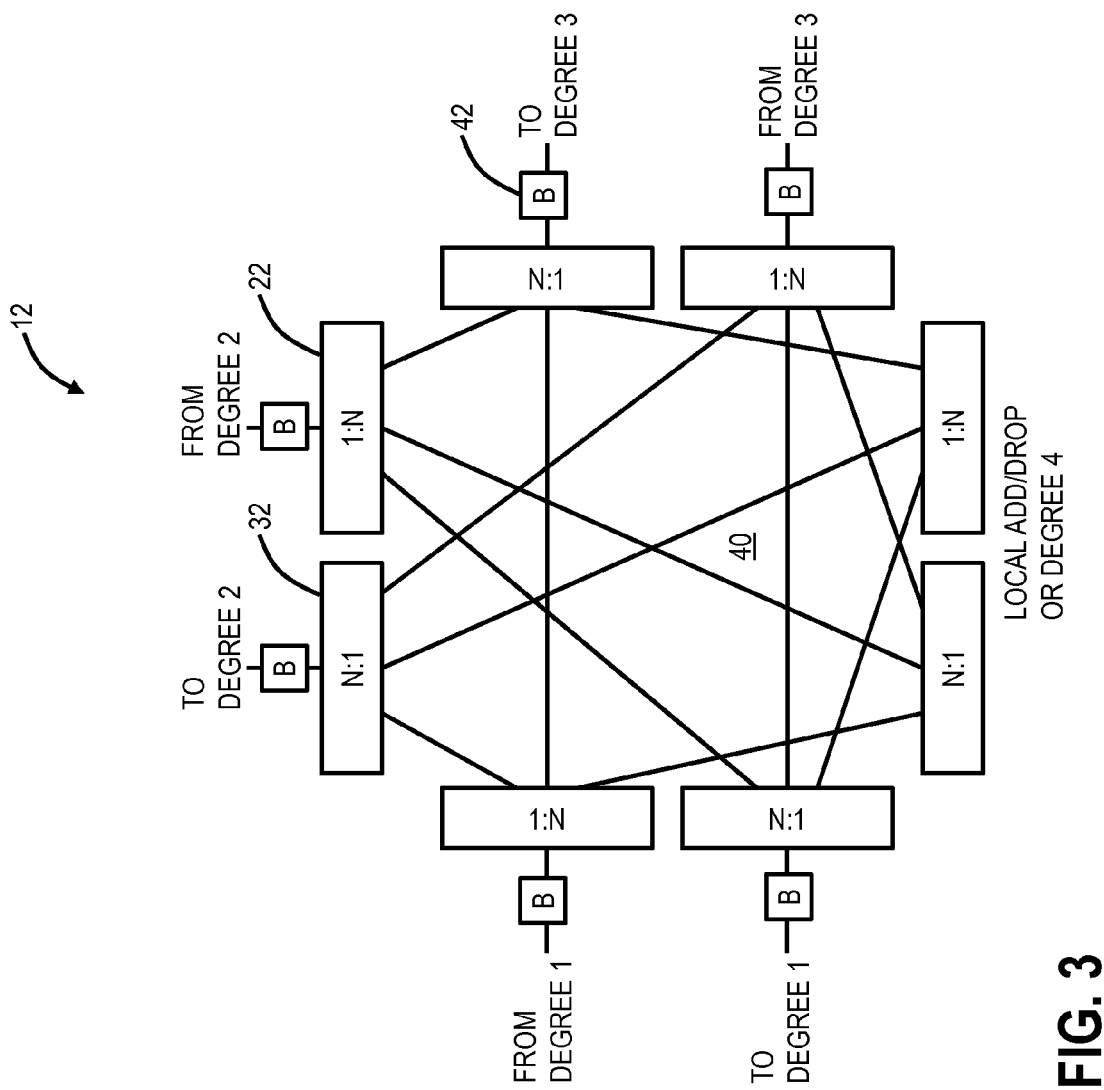
FIG. 3 is a schematic diagram of an exemplary implementation of a node in an all-broadcast architecture, such as in the networks of FIGS. 1 and 2.

Referring to FIG. 3, in an exemplary embodiment, a schematic diagram illustrates an exemplary implementation of a node 12 in an all-broadcast architecture. One or more nodes in the network 10 can be implemented using an all-broadcast architecture of the node 12. For example, FIG. 3 is described in commonly assigned U.S. Pat. No. 8,554,074 issued Oct. 8, 2013 and entitled "COLORLESS, DIRECTIONLESS, AND GRIDLESS OPTICAL NETWORK, NODE, AND METHOD." The all-broadcast architecture can be formed by N:1 combiners 32 and 1:N splitters 22. The node 12 is shown for illustration purposes as a three degree node with one add/drop side, i.e., N=4 for the N:1 combiners 32 and the 1:N splitters 22. It is also possible to construct the node 12 as a two degree node or more using less ports on the devices 22, 32 or adding additional ports on the devices 22, 32. The devices 22, 32 form a routing fabric 40 in which received signals on any degree are simultaneously broadcast to all other degrees and to local add/drop, i.e., as the term all-broadcast architecture implies. The local add/drop can include tunable transceivers, such as coherent receivers configured to receive all wavelengths on the optical spectrum and selectively tune to a wavelength of interest. The node 12 also includes optical blocking elements 42 on each external port to and from the various degrees. For the all-broadcast architecture in the network 10, the optical blocking elements 42 prevent multiple paths by constraining each channel to a single path. The optical blocking elements 42 can be remotely set to on/off and in implementation can include, for example, a selectively enabled VOA. Using the node 12, the routing systems and methods are configured to determine blocking settings on the optical blocking elements 42. Note, the optical blocking elements 42 can be anywhere in the node 12, such as on the egress, ingress, etc. In an exemplary embodiment, the optical blocking elements 42 can be made to be a wavelength selective switch.

Broadcast Service Bandwidth Management

Figure 4:
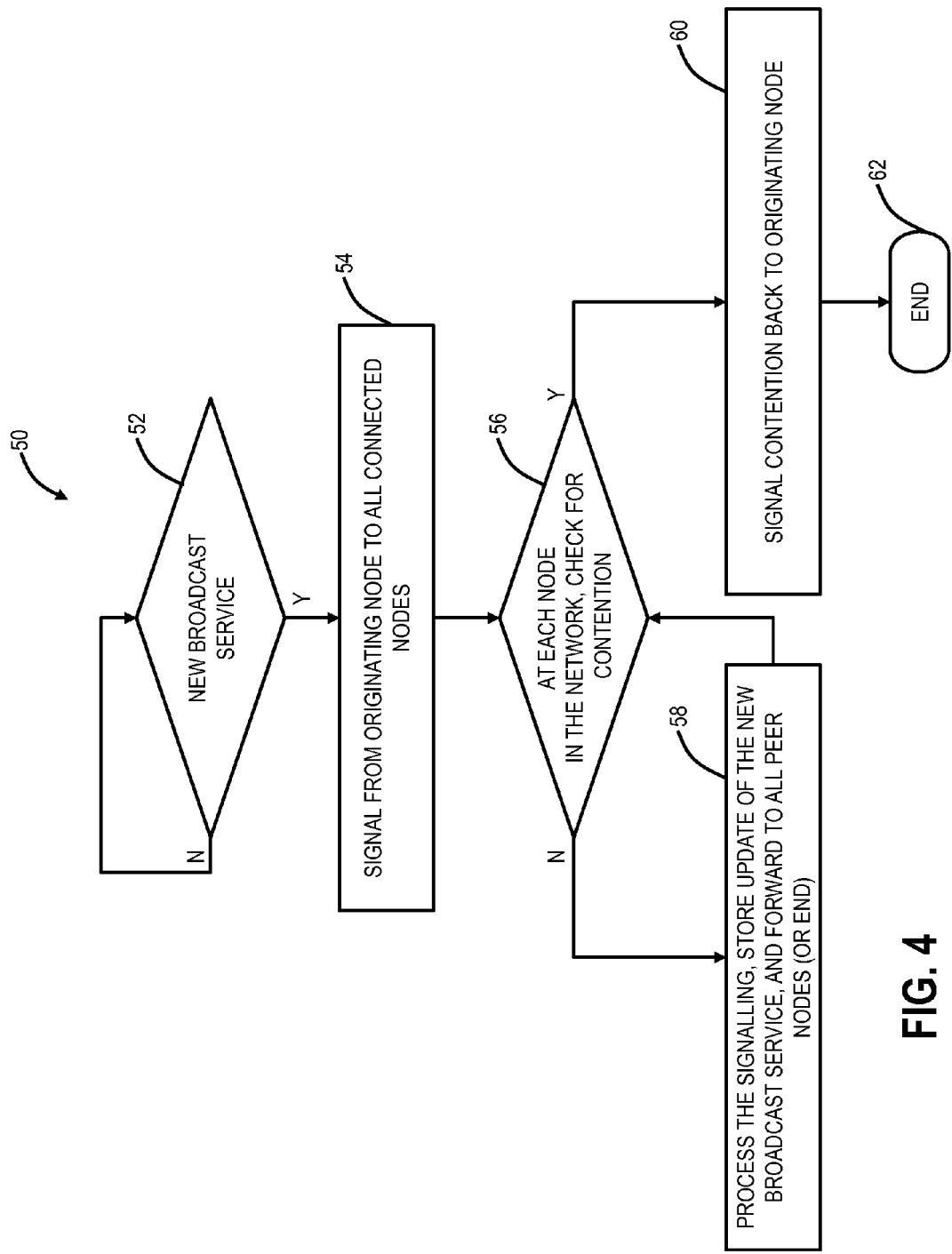
FIG. 4 is a flow chart of a bandwidth management process for an optical broadcast service.

Referring to FIG. 4, in an exemplary embodiment, a flow chart illustrates a bandwidth management process 50 for an optical broadcast service. The bandwidth management process 50 contemplates operation by and between the nodes 12 in the optical broadcast network 10. That is, the bandwidth management process 50 operates in a distributed fashion such as in a control plane or the like. The bandwidth management process 50 can be implemented in existing control planes such as ASON, GMPLS, OSRP, etc. or in a new control plane. Specifically, in one aspect, the bandwidth management process 50 enables the optical broadcast network 10 to be managed by a control plane in combination with ROADM mesh networks. In another aspect, the bandwidth management process 50 enables the optical broadcast network 10 to be managed alone, or with other broadcast networks. The bandwidth management process 50 in effect extends control plane operation to support the optical broadcast network 10, or any other type of optical broadcast network.

The bandwidth management process 50 begins with a new broadcast service (step 52). Here, there is a request to provision the broadcast service between terminal nodes. Again, as described herein, the broadcast service is a wavelength (or a portion of optical spectrum) which is broadcast on all links in the optical broadcast network. In the context of a control plane, the bandwidth management process 50 includes signaling from an originating node to all connected nodes in the network (step 54). Traditionally, signaling in a control plane involves sending a request along a desired path for the connection.

The bandwidth management process 50 includes two techniques of signaling—1) broadcast signaling and 2) routing plane "domino effect" signaling. Both approaches ensure the signaling is eventually sent on all links in the network. In the broadcast signaling, signaling is sent out all links from the originating node, including both links which the service traverses to its ultimate terminating node and links which are not on a path to the terminating node. The broadcast signaling mirrors the path the broadcast service will take once provisioned. With the broadcast signaling, wavelength contention automatically resolves itself via a crank-back from broadcast domain even though it is not part of service route. Horizontal sync automatically resolves contention and convergence issues over link recovery and node reboot scenarios. The broadcast signaling is an automatic control plane signaling mechanism for maintaining the service and wavelength states across the network.

The routing plane "domino effect" signaling operates with directional signaling from the originating node to the terminating node to setup the service on the associated path and reservation/acknowledgment signaling outside of the associated path. This signaling mirrors a domino effect. The difference between the broadcast signaling and the "domino effect" signaling is the broadcast signaling sends the same signaling everywhere and the "domino effect" signaling sends setup signaling on the associated path and separate reservation signaling outside of the path. Note, the signaling, in both cases, has two purposes—1) to let the destination node know to set up the broadcast service and 2) for each node in the network to check for contention (step 56).

Again, traditionally, the signaling is used to set up a connection at each node in the associated path. This is not required in optical broadcast network since the equipment is configured to simply broadcast a wavelength or spectrum on all links in the network, there is no provisioning required (i.e., at non-terminal nodes) except at the originating and terminating nodes (i.e., the terminal nodes). Note, there may be provisioning required at switching or filtering points or blocking points in the network. This is where cycles are prevented. Contention checks to ensure the wavelength or portion of the spectrum is not equipped or used on any link at all of the nodes in the optical broadcast network.

Again, traditionally, contention only needs to be checked on a specific path of the connection in non-broadcast networks. Stated differently, in a non-broadcast network, a same wavelength or portion of the spectrum can be used by different connections on disparate paths. This is not the case in the optical broadcast network. At each node (i.e., bypass nodes, intermediate add/drop nodes, non-terminal nodes, and terminal nodes), the signaling is received and used to check whether the wavelength or portion of the spectrum is used by any other connections (for any purpose including non-broadcast services).

If there is not contention, a node processes the signaling and stores an update of the network broadcast service, and forwards the signaling to all peer nodes (step 58). Here, the node processes the signaling to determine if any action is required to establish the broadcast service, such as provisioning equipment at terminal nodes (i.e., at the terminating node or any intermediate add/drop node). The provisioning can include, without limitation, provisioning transceivers, turning on/off blocking elements, provisioning switching ports or filters (e.g., WSSs, etc.), and the like. The provisioning is likely only required at the terminating node in a typical broadcast network since all other nodes in the broadcast network are configured to simply broadcast all services to all peer nodes. However, to prevent cycles, there is a requirement to prevent loops, in a ring or mesh network, such that the broadcast service does not interfere with itself.

At each node, the node is configured to store an update of the new broadcast service. Here, the node simply maintains an entry in an associated database or data store that the broadcast service occupies the associated wavelength or portion of spectrum. This is used in the future to prevent contention, i.e., the node uses this database or data store to check in the step 56 for future services (or for non-broadcast services). Finally, after or concurrent with processing and storing the signaling, the node forwards the signaling to all peer nodes in the network. Here, the node will forward the signaling on all links associated with the node except the link on which the signaling was received. In this manner, the signaling is properly flooded to all nodes in the network. Alternatively, the node does not forward the signaling if the node is a node where the wavelength or portion of spectrum is not broadcast further as is the case when the node has no additional links besides the link on which the signaling was received or the node switches/filters the wavelength or portion of spectrum such that it is not broadcast further from the node.

If there is contention, the detecting node signals the contention back to the originating node (step 60), and the bandwidth management process 50 ends (step 62). Here, the detecting node is preventing establishment of the service by letting the originating node know there is contention. That is, the wavelength or portion of spectrum in the signaling is already provisioned on one or more links associated with the node (either as a broadcast service or non-broadcast service). This can be through crank-back signaling or through a forced delete. The objective here is to 1) prevent establishment of the broadcast service on the particular wavelength or portion of spectrum due to the contention and 2) let the originating node know of the contention so that the broadcast service can be retried on a different wavelength or portion of spectrum.

The bandwidth management process 50 can be viewed as a bandwidth management update process in the control plane where an update on a link is pushed by a store->reserve/unreserve on peers->forward workflow on any link in the network. That is, the bandwidth management process 50 extends existing control planes to reserve/unreserve wavelengths or portions of spectrum on all nodes. Since every "node terminal" link in a broadcast network will have broadcast peers, an update on one link is stored, lookup for peer broadcast link entries is performed, next reservation is done which in turn leads to further flooding of bandwidth update across the whole network, until a terminal or switched/filtered link is encountered. These updates are seamless to broadcast/mesh networks thus control plane in mesh networks just sees the wavelengths being occupied in broadcast network links.

Broadcast Signaling Example

Figure 5:
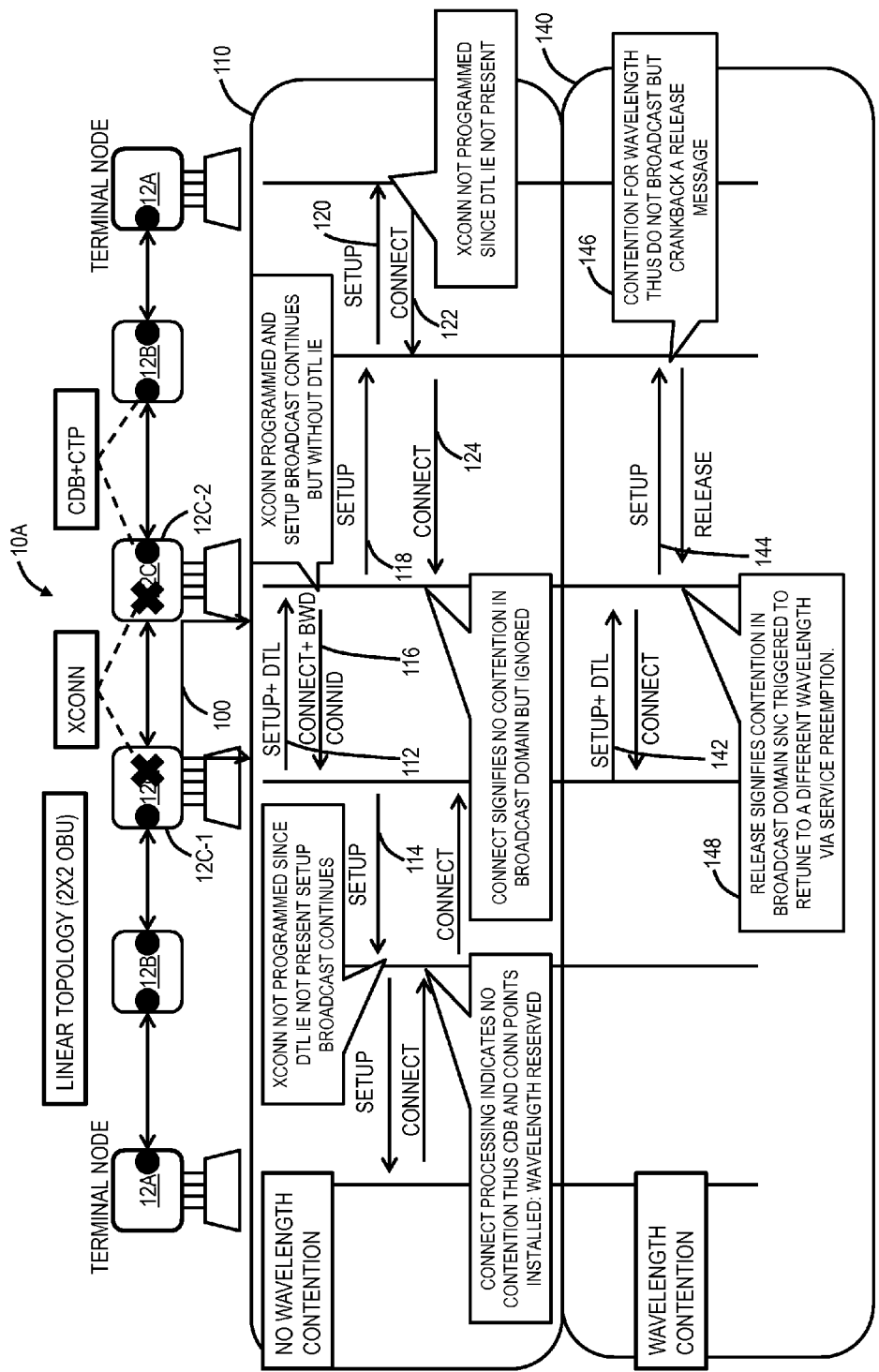
FIG. 5 is a network diagram and flow diagrams of the optical broadcast network of FIG. 1 performing the bandwidth management process of FIG. 4 for a service with the broadcast signaling with and without contention.

Referring to FIG. 5, in an exemplary embodiment, a network diagram and flow diagrams illustrate the optical broadcast network 10A performing the bandwidth management process 50 for a service 100 with the broadcast signaling with and without contention. Specifically, the service 100 is between the intermediate add/drop nodes 12C, with node 12C-1 being the originating node and node 12C-2 being the terminating node. First, operations are described without wavelength contention 110. The originating node 12C-1 sends a SETUP message with a Designated Transit List (DTL) Information Element (IE) to the node 12C-2 (step 112) and a SETUP message without the DTL to the node 12B (step 114). At the node 12C-2, the SETUP message with the DTL is received and a cross-connect (XCONN) is programmed, a CONNECT message with a Backward (BWD) connection ID (CONNID) is sent back to the node 12C-1 (step 116) and a SETUP message is sent to the node 12B without the DTL IE (step 118). Note, BWD is simply Backward since the CONNECT message travels in backward direction thus the connection IE (Info Element) is called BWD Connection IE. Similarly, the SETUP message carries FWD (Forward Connection IE).

The setup message without the DTL IE is received by the node 12B and the node 12A (step 120), but not cross-connects are programmed since there is no DTL IE present. The DTL IE is a path of the service 100, in this case nodes 12C-1 to 12C-2. The lack of the DTL IE in the SETUP messages to the nodes 12B, 12A signifies they are in the broadcast domain, but do not require provisioning. Each of the nodes 12A, 12B transmit a CONNECT message (steps 122, 124) back to the node 12C-2 signifying there is no contention, but these messages are ignored since there is no action required. However, responsive to the SETUP message, the nodes 12A, 12B update their databases to signify the presence of the service 100. The process similarly follows from the node 12C-1 to the nodes 12B, 12A after the step 114. The CONNECT message signifies no contention, CDB and CONN points are installed on the nodes 12A, 12B reserving the wavelength, but no physical cross-connects are required. Note, CDB and Connection Termination Points (CTP) can be created at the nodes 12A, 12B. CDB is a Call/Connection Data Block with information about the half connection point, since the signaling is based on half call model.

For wavelength contention 140, the originating node 12C-1 sends a SETUP message with a Designated Transit List (DTL) Information Element (IE) to the node 12C-2 (step 142), and the SETUP message with the DTL IE is sent to the node 12B (step 144). The node 12B detects contention (step 146), and, in response, does not broadcast any further SETUP messages, but rather crank-backs a RELEASE message (step 148) to the nodes 12C-1, 12C-2. The RELEASE message signifies contention in the broadcast domain and the service 100 (e.g., a sub-network connection (SNC)) can be triggered to retune to a different wavelength via service preemption (step 148). Note, as described herein, the DTL can be another type of list based on the control plane technology used. For example, this could be an Explicit Route Object (ERO) in GMPLS, or the like.

"Domino Effect" Signaling Example

Figure 6:
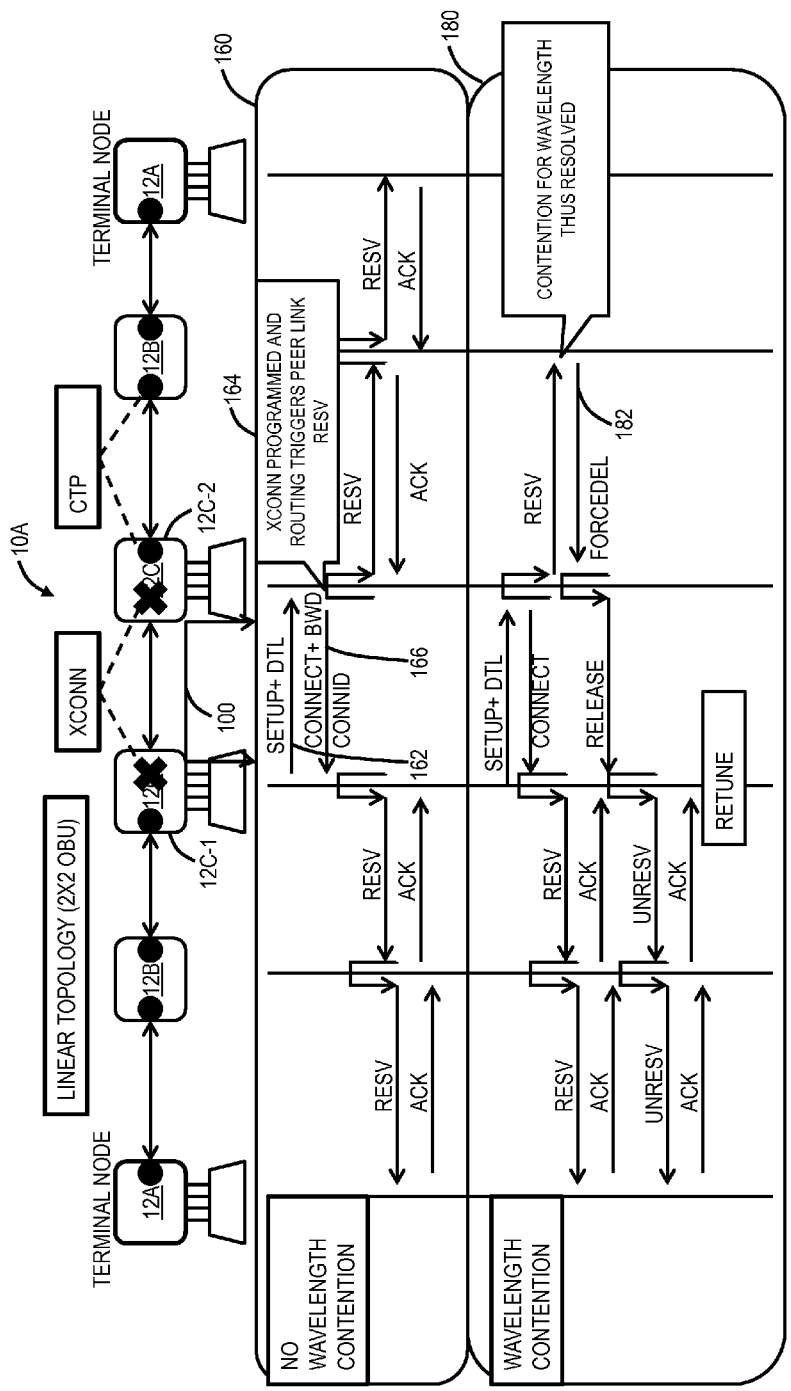
FIG. 6 is a network diagram and flow diagrams of the optical broadcast network of FIG. 1 performing the bandwidth management process of FIG. 4 for a service with the domino effect signaling with and without contention.

Referring to FIG. 6, in an exemplary embodiment, a network diagram and flow diagrams illustrate the optical broadcast network 10A performing the bandwidth management process 50 for a service 100 with the "domino effect" signaling with and without contention. Specifically, the service 100 is between the intermediate add/drop nodes 12C, with node 12C-1 being the originating node and node 12C-2 being the terminating node. First, operations are described without wavelength contention 160. The originating node 12C-1 sends a SETUP message with a Designated Transit List (DTL) Information Element (IE) to the node 12C-2 (step 162). The node 12C-2 programs a cross-connect in response to the SETUP message and routing triggers peer link RESV messages (step 164). Also, the node 12C-2 sends a CONNECT message with a BWD connection ID (CONNID) is sent back to the node 12C-1 (step 166). The "domino effect" signaling does not use SETUP messages without DTL IEs for the broadcast domain, but rather RESV messages so that the nodes can reserve the associated wavelength for the service 100 locally, and respond with ACK messages. Here, the SETUP message from the step 162 causes the RESV message from the node 12C-2 to the node 12B, and the CONNECT message from the step 166 causes the RESV message from the node 12C-1 to the node 12B, akin to a domino effect.

For wavelength contention 180, the SETUP message proceeds as above between the nodes 12C-1, 12C-2. The contention is at the node 12B adjacent from the node 12C-2. The domino effect causes the RESV messages to reserve the wavelength for the service 100 at the nodes 12A, 12B, adjacent from the node 12C-1. However, the node 12B adjacent from the node 12C-2 transmits a FORCEDEL (forced delete) message to the nodes 12C-1, 12C-2 (step 182) which causes a release of the service 100 and UNRESV messages to propagate removing the wavelength reservation. Once complete, the originating node 12C-1 can retune the service 100 to a different wavelength.

Wavelength Map

Figure 7:
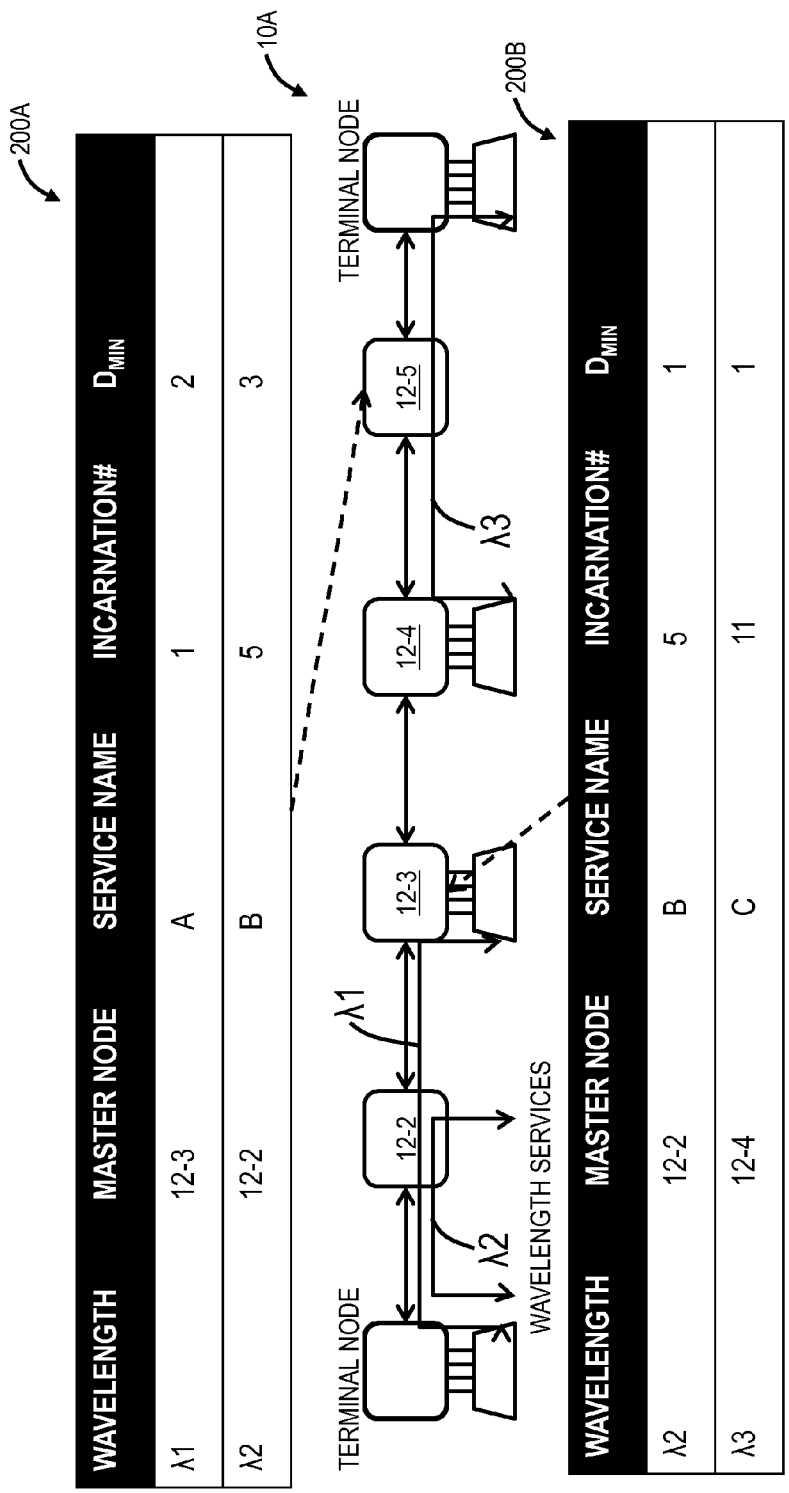
FIG. 7 is a network diagram and tables of the optical broadcast network of FIG. 1 with exemplary wavelength maps.

Referring to FIG. 7, in an exemplary embodiment, a network diagram and tables illustrate the optical broadcast network 10A with exemplary wavelength maps. A wavelength map 200A is shown for a node 12-5 (which is a bypass node in the optical broadcast network 10A) and a wavelength map 200B is shown for a node 12-3 (which is an intermediate add/drop node in the optical broadcast network 10A). For illustration purposes, three wavelengths $\lambda 1$, $\lambda 2$, $\lambda 3$ are shown in the optical broadcast network 10A. Also, the wavelength maps 200A, 200B only illustrate information for the wavelengths $\lambda 1$, $\lambda 2$, $\lambda 3$ not involved at the nodes 12-3, 12-5. From a terminology perspective, a master node: node which is either head or tail of the connection providing $D_{min}$, and $D_{min}$ is a number of hops to reach the master node (the assumption is, closer you are to the cause, the more accurate, since the routing mechanism is based on the domino effect). The wavelength maps 200A, 200B can include identification of the wavelengths $\lambda 1$, $\lambda 2$, $\lambda 3$, identification of the associated master nodes, a service name, an incarnation number, and the associated $D_{min}$.

Extended Horizontal Sync—Contention Resolution

Horizontal sync is mechanism to recover connections state after node and/or link recovery. The term horizontal sync is used to reference two nodes communicating to one another, i.e., peers, thus horizontal. Vertical sync includes a control plane communicating to hardware, i.e., up and down, vertically. The horizontal sync in optical broadcast networks is extended to keep track of connection states based on ownership across all nodes in the network. This is being implemented as an extended horizontal sync across the network not just the nodes adjacent to the point of recovery (link/node). As an example, if a link goes down and causes same wavelength to be used in the two segments since there is no way to validate while the link is down, on link recovery the extended horizontal sync detects this contention. This contention can lead to the following: a) no action taken on a master node (e.g., the node with a higher node ID), b) the slave node triggers a force delete (FORCDEL) for the connection (with contention wavelength) towards its side for the same wavelength (optical service may be on the same or a few hops away), c) this traverses to the head end of the connection via the domino effect signaling described herein, and d) the head end decides to either tear down service or retune to a suitable wavelength. A similar mechanism can be used for cases where a connection is released in one segment during the time that link is down. This ensures that the wavelength is correctly freed in the network after the link recovery.

Figure 8:
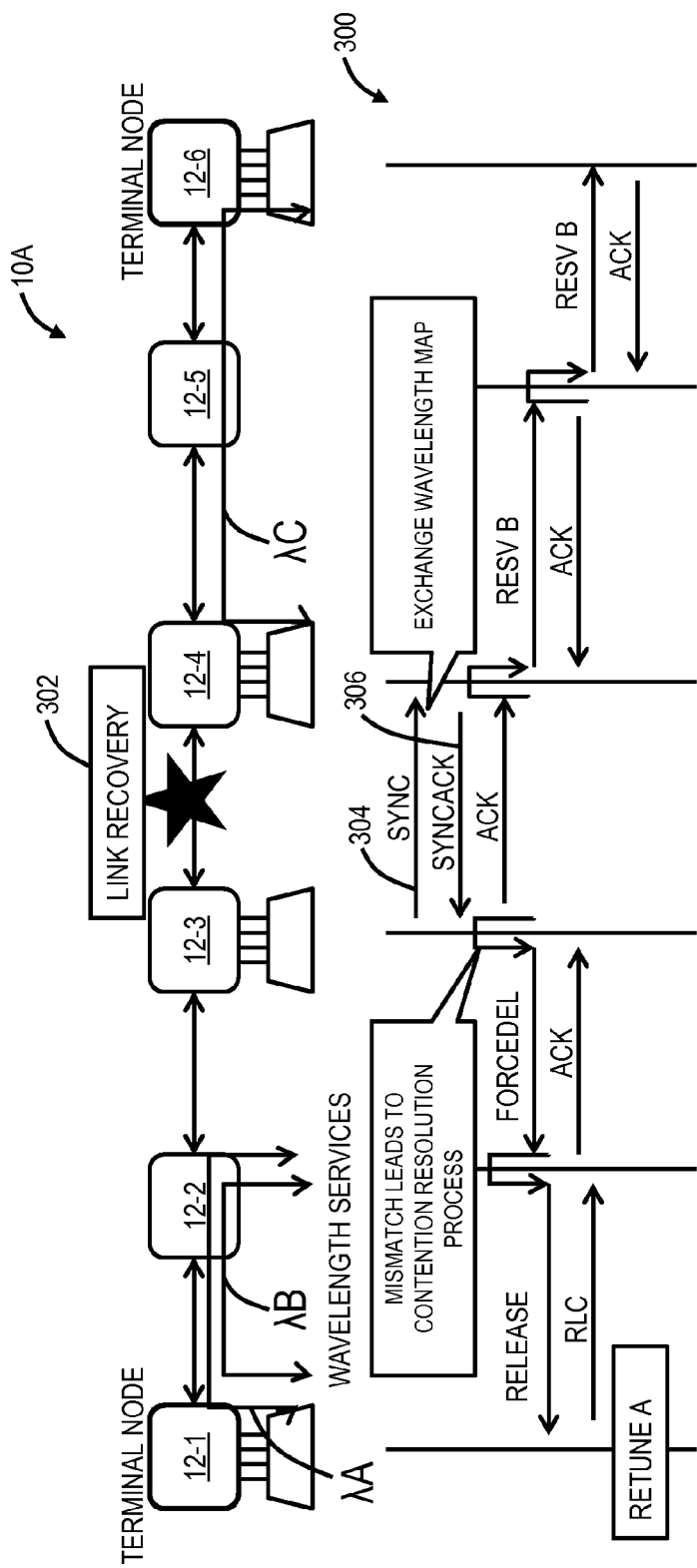
FIG. 8 is a network diagram of the optical broadcast network of FIG. 1 showing an exemplary extended horizontal sync operation.

Referring to FIG. 8, in an exemplary embodiment, a network diagram illustrates the optical broadcast network 10A showing an exemplary extended horizontal sync operation 300. Assume there is a break, fault, etc. between the nodes 12-3, 12-4, and during such time, wavelengths $\lambda A$, $\lambda B$, $\lambda C$ are provisioned, $\lambda A$ is the same as $\lambda C$. At a point 302, the link between the nodes 12-3, 12-4 recovers, and the extended horizontal sync operation 300 is implemented. The extended horizontal sync operation 300 is contention resolution based on Master/Slave logic. The sync logic cab also work in same way whenever a new node is introduced as terminal ends. The contention resolution based on $D_{MIN}$, and FIG. 9 illustrates a contention resolution process 350.

After the point 302, the extended horizontal sync operation 300 includes the node 12-3 sending a SYNC message to the node 12-4 with its wavelength map (step 304) and the node 12-4 sends a SYNCACK message to the node 12-3 with its wavelength map (step 306). With the wavelength maps, the nodes 12-3, 12-4 can perform the contention resolution process 350. As a result, the node 12-3 determines to remove the wavelength λA, sending a FORCEDEL to the master node for the wavelength λA (the node 12-2) which sends a RELEASE message to the node 12-1, and retunes the wavelength λA. For wavelength λB, there is no contention, but it needs to be reserved, thus RESV messages are sent.

Contention Resolution Process

Figure 9:
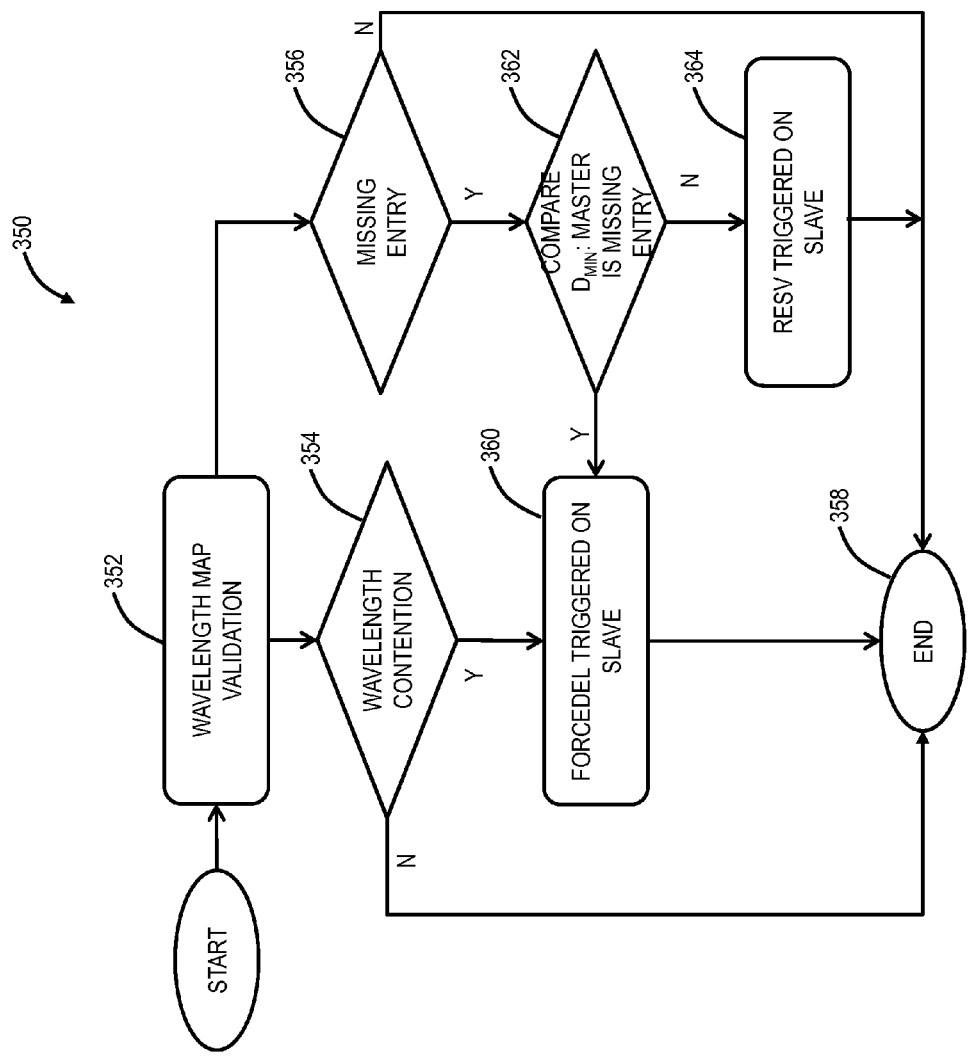
FIG. 9 is a flow chart of a contention resolution process.

Referring to FIG. 9, in an exemplary embodiment, a flow chart illustrates a contention resolution process 350. For illustration purposes, the contention resolution process 200 is described with reference to the domino effect signaling, using FORCEDEL and RESV messages as opposed to RELEASE (crank-back) and SETUP (with DTL IE) messages. The contention resolution process 350 can be implemented at each node in a network to check for contention, such as in the step 56 of the bandwidth management process 50. The contention resolution process 350 can also be implemented as part of the extended horizontal sync operation 300.

The contention resolution process 350 is implemented at a node 12 and includes validation of a wavelength map (step 352). The validation of a wavelength map can include checking a new service against an existing wavelength map at the node 12 as is the case in the bandwidth management process 50 or comparing another node's 12 wavelength map with its wavelength map as is the case in the extended horizontal sync operation 300. If there is no wavelength contention (step 354) and no missing entries (step 356), the contention resolution process 350 ends (step 358) with a valid result—for the bandwidth management process 50 or the extended horizontal sync operation 300.

If there is wavelength contention (step 354), the contention resolution process 350 includes triggering a force deletion (FORCEDEL) through a slave node (step 360). In an exemplary embodiment, the designation of master and slave can be based on node ID, e.g., lower ID is slave, etc. In another exemplary embodiment, the designation of master and slave can be based on $D_{MIN}$, a lower $D_{MIN}$ signifies the master. Other embodiments are also contemplated. If there is a missing entry in the wavelength map (step 356), the contention resolution process 350 compares the $D_{MIN}$ and the master is the missing entry. The contention resolution process 350 either triggers a RESV message on the slave (step 364) or FORCEDEL message on the slave (step 360).

The contention resolution process 350 recognizes there are two kinds of errors that have to be resolved when re-connecting two parts of a network—Wavelength contention and missing entries. For wavelength contention, two services were added to the network, each in a separate half of the disconnected network, while a link was down. With the contention resolution process 350, FORCEDEL is triggered on the part of the network that is on the slave end of the link. Since all broadcast services are equal priority, for contention resolution one service is requested to be retuned on the slave node (e.g., Lower Node ID, etc.). In case the services have priorities, this logic acts as pre-empting the lower priority service (i.e. retune the same).

For a missing entry, a service was added (or deleted) from one half of the disconnected network. If it was added, then that wavelength needs to be marked in-use in the other part of the network, upon re-connecting. If it was deleted, then the wavelength needs to be marked free in the other part of the network. Missing entries raise a question which cannot be resolved by Master-slave logic. Thus the use of the $D_{min}$ concept (Distance of current node from the head/tail end of the service for which the map entry is missing). The lower the $D_{min}$ signifies that current node occurs earlier in the forwarding path of the wavelength map and thus is correctly updated. Thus depending on the view of this node where the $D_{min}$ is lower, either the missing entry is provisioned or cleaned up on the peer node, and thus flooded across the network upstream/downstream.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for bandwidth management in an optical broadcast network, the method comprising:
    signaling, for a new optical broadcast service, from an originating node to all nodes in the optical broadcast network, wherein the signaling identifies a wavelength or portion of spectrum associated with the new optical broadcast service;

at each of the nodes, checking for contention by the new optical broadcast service;

responsive to identifying contention at one of the nodes, signaling the identified contention back to the originating node; and responsive to no contention at any of the nodes, processing the signaling, storing an update of the new optical broadcast service, and either forwarding the signaling to peer nodes or terminating the signaling.

2. The method of claim 1, wherein the signaling is provided to at least one node not in a path between the originating node and a terminating node of the optical broadcast service.

3. The method of claim 1, wherein the signaling is performed through a control plane associated with the optical broadcast network.

4. The method of claim 1, wherein the signaling is broadcast from the originating node to all peer nodes, on all links from the originating node.

5. The method of claim 4, wherein the signaling is a setup message with instructions to all nodes in the optical broadcast network where provisioning is required to establish the new optical broadcast service and a same setup message without the instructions to all nodes in the optical broadcast network where provisioning is not required, but contention checking and database updates are required.

6. The method of claim 4, wherein the signaling the identified contention is a crank-back to the originating node.

7. The method of claim 1, wherein the signaling is broadcast from the originating node to a terminating node along a path, and broadcast from the originating node and the terminating node to non-participating nodes through reservation messages, with a domino effect.

8. The method of claim 7, wherein the signaling the identified contention is a forced deletion to the originating node.

9. The method of claim 1, wherein the update of the new optical broadcast service is stored in a wavelength map maintained at each of the nodes in the network, and responsive to a link recovery between two nodes, each of the two nodes are configured to perform a horizontal synchronization with one another ensuring no contention exists by exchanging and validating associated wavelength maps.

10. The method of claim 1, wherein the signaling is performed through a control plane configured to operate in a non-broadcast optical network, and wherein the signaling is provided to at least one node not in a path between the originating node and a terminating node of the optical broadcast service.

11. A node in an optical network supporting an optical broadcast service, the node comprising:

a plurality of broadcast ports formed through an optical broadcast unit; and a controller configured to signal, for a new optical broadcast service, to all nodes in the optical network, wherein the signal identifies a wavelength or portion of spectrum associated with the new optical broadcast service, receive notification from all of the nodes related to contention in the optical network, responsive to contention in the optical network, retune the new optical broadcast service, and responsive to no contention in the optical network, provision the new optical broadcast service.

12. The node of claim 11, wherein the controller is configured to maintain a wavelength map that is updated responsive to signaling from other nodes in the optical network relative to newly provisioned optical broadcast services.

13. The node of claim 11, wherein the controller is configured to, responsive to a link recovery between two nodes, perform a horizontal synchronization with another node ensuring no contention exists by exchanging and validating associated wavelength maps.

14. The node of claim 11, wherein the controller is configured to operate a control plane, wherein the node is an originating node of the new optical broadcast service, and wherein at least one node not in a path between the originating node and a terminating node of the new optical broadcast service is provided the signal, through the control plane.

15. The node of claim 11, wherein the signal is broadcast from the node to all peer nodes, on all links from the node.

16. The node of claim 11, wherein the signal is broadcast from the node to a terminating node along a path, and broadcast from the node and the terminating node to non-participating nodes through reservation messages, with a domino effect.

17. An optical network with bandwidth management for optical broadcast services, the optical network comprising:

a plurality of nodes interconnected by a plurality of links; and a control plane configured to signal, for a new optical broadcast service, from an originating node to all nodes in the optical network, wherein the signal identifies a wavelength or portion of spectrum associated with the new optical broadcast service, at each of the plurality of nodes, check for contention by the new optical broadcast service, responsive to identified contention at a node, signal the identified contention back to the originating node, and responsive to no contention at the node, process the signal, store an update of the new optical broadcast service, and either forward the signal to peer nodes or terminate the signal.

18. The optical network of claim 17, wherein at least one node not in a path between the originating node and a terminating node of the optical broadcast service is provided the signal.

19. The optical network of claim 17, wherein the signal is broadcast one of i) from the originating node to all peer nodes, on all links from the originating node or ii) from the originating node to a terminating node along a path, and broadcast from the originating node and the terminating node to non-participating nodes through reservation messages, with a domino effect.

20. The optical network of claim 17, wherein the update of the new optical broadcast service is stored in a wavelength map maintained at each of the plurality of nodes, and responsive to a link recovery between two nodes, each of the two nodes are configured to perform a horizontal synchronization with one another ensuring no contention exists by exchanging and validating associated wavelength maps.

* * * * *